United States Patent [19]
Lehle

[11] Patent Number: 4,908,564
[45] Date of Patent: Mar. 13, 1990

[54] DEVICE FOR SPEED CONTROL OF AN ASYNCHRONOUS MOTOR

[75] Inventor: Erhard Lehle, Muehlheim am Main, Fed. Rep. of Germany

[73] Assignee: D.I.E.N.E.S. Apparatebau GmbH, Muehlheim am Main, Fed. Rep. of Germany

[21] Appl. No.: 205,433

[22] Filed: Jun. 10, 1988

[30] Foreign Application Priority Data

Jun. 11, 1987 [DE] Fed. Rep. of Germany ....... 3719463

[51] Int. Cl.$^4$ ............................................. H02P 5/40
[52] U.S. Cl. .................................................. 318/807
[58] Field of Search ................. 318/800, 803, 807–811

[56] References Cited

U.S. PATENT DOCUMENTS 4,327,315 4/1982 Kawada et al. ..................... 318/803
4,330,741 6/1982 Nagase et al. ....................... 318/803

Primary Examiner—David Smith, Jr.
Attorney, Agent, or Firm—Horst M. Kasper

[57] ABSTRACT

The properties synchronous motors are provided to an asynchronous motor fed with the aid of a digital speed control via a static converter. For this purpose, a signal proportional to an integral of the rotation-speed deviation, and a signal corresponding to the rotation-speed set-point value, are multiplied with each other and therefrom is obtained the control-pulse sequence for the converter. From an input sequence corresponding to the measured rotation speed, a signal corresponding to the period duration of the rotation-speed measurement-device frequency is obtained, and this signal is divided by a value corresponding to the rotation-speed set-point value. The period-duration signal referring to the rotation-speed set-point value thus obtained is switched opposite to the control-deviation signal, before the control-deviation signal is fed to the multiplier.

45 Claims, 3 Drawing Sheets

DEVICE FOR SPEED CONTROL OF AN ASYNCHRONOUS MOTOR

BACKGROUND OF THE INVENTION

1. Field of the Invention

The invention relates to a device for digital speed control of an asynchronous motor via a static converter.

2. Brief Description of the Background of the Invention Including Prior Art

In many cases, a very accurate automatic control of drive motors for transport and heating galettes of textile machines is required to assure a uniform yarn quality. In addition, numerous other application areas of electric motors require the same features.

In such cases, direct-current motors as well as synchronous motors are employed. However, both are costly and the required control devices are also expensive. Asynchronous motors, which are fed via a static power converter, are much more economical.

A rotation speed control circuit as set forth above is known from the U.S. Pat. No. 3,887,853. The first input of a first summator is fed from the output of the digital to analog converter and the second input is fed from the output of a frequency/voltage converter receiving rotation-speed set point pulses. A second summator follows to this first summator, which receives its second input signal from a special attenuation circuit. The attenuation circuit receives rotation-speed actual-value pulses from the rotation-speed measurement device connected to the motor and converts these into a voltage proportional to the rotation-speed actual value. This voltage is fed, together with the output signal of the second summator, to the two inputs of a third summator. A delay circuit and a filter network follow the third summator. The output of the filter is connected to a second input of the second summator. In this manner, an internal integrating negative or inverse feedback circuit is formed, which opposes the phase swinging or pendulum oscillations and the resonance phenomena of the rotation-speed control circuit and of the motor. The output signal of the second summator controls the power inverter.

SUMMARY OF THE INVENTION

1. Purposes of the Invention

It is an object of the invention to provide a control device which practically imparts an asynchronous motor with the behavior of a synchronous motor.

It is another object of the invention to provide an asynchronous motor where the dependency of the rotation speed on the load and on the supply voltage is eliminated.

It is yet another object of the invention to provide an asynchronous motor with a precise speed control.

It is yet another object of the invention to provide a control of an asynchronous motor where the load dependence of the rotation speed is eliminated. The slippage in the case of an asynchronous motor, i.e. the difference of the rotating-field speed and the actual rotor speed relative to the rotating-field speed, is approximately proportional to the provided torque.

It is a further object of the invention that the circuit is to be realized with conventional semi-conductor elements, is easy to be adjusted to different application conditions, and can be economically produced and requires little space.

These and other objects and advantages of the present invention will become evident from the description which follows.

2. Brief Description of the Invention

The invention provides a phase-locked coupling of the control pulse sequence fed to the power inverter with the input pulse sequence corresponding to the rotation-speed set point value such that a defined rotor displacement angle is maintained even in case of load changes.

A device for digital speed control of an asynchronous motor is fed via a static power converter. The static power converter has an input and an output. The motor is connected to the output of the static power converter. A rotation speed measurement device has an output and is coupled with the motor and delivers a first pulse sequence. The first pulse sequence is proportional in its frequency to the actual rotation speed. A digital up/down counter has a first input connected to the output of the rotation speed measurement device, having a second input, and having an output. The first pulse sequence delivered by the rotation-speed measurement device is fed to a first input of the digital up/down counter and a second pulse sequence $f_n$, for setting the set-point rotation speed, is fed to the second input of the digital up/down counter. A digital signal is provided at the output of the up/down counter in case of coinciding first input-pulse sequence and second input-pulse frequencies. The digital signal at the output of the up/down counter deviates from the mean value of the counter by an amount depending on the load while, during frequency deviation, a digital rotation-speed error signal occurs deviating upwardly or downwardly from this value of the up/down counter. A digital to analog converter has an input connected to the output of the up/down counter and an output, where the digital to analog converter follows the up/down counter output. A summator has a first input and a second input and an output, where the output of the digital to analog converter is placed in connection with a first input of the summator and where a voltage, depending on the rotation-speed set-point value ($f_n$) and on the period duration ($1/f_i$) of the rotation-speed measurement-device output signal ($f_i$), is fed to the second output of the summator. A multiplier has a first input and an output, where an output of the summator is connected to the first input of a multiplier. A frequency voltage converter has a first input, a second input and having an output, where a pulse sequence ($f_n$), corresponding to a set-point rotation speed, is fed to the first input of the frequency/voltage converter and where the output of the frequency/voltage converter is connected to the other input of the multiplier and the output of the frequency/voltage converter feeds a voltage, proportional to the set-point rotation speed ($f_n$), to the multiplier. A voltage/frequency converter has an input and an output. The output of the multiplier is connected to the input of the voltage/frequency converter. The output of the voltage/frequency converter is connected to the input of the static power converter. The output signal of the digital to analog converter delivers the digital control signal for the converter static power converter after comparison with a voltage proportional to a set-point rotation speed via the voltage/frequency converter.

A time period/voltage converter circuit can have a first input, a second input and an output. The first input of the time period/voltage converter circuit can be connected to the output of the frequency/voltage converter. The second input of the time period/voltage converter circuit can be connected to the rotation-speed measurement device for delivering an output voltage depending both on the rotation-speed set-point value ($f_n$) as well as on the period duration ($1/f_i$) of a rotation-speed measurement-device output signal ($f_i$), while the output of the time period/voltage converter circuit can be connected to the second input of the summator.

The time period/voltage converter circuit can comprise a first monoflop having an input and an output and receiving at the input as an input signal the pulse sequence ($f_i$) of the rotation-speed measurement device corresponding to the actual rotation speed. A second monoflop can have an output and can be connected in series to the first monoflop. A current generator can deliver a current ($I_n$) corresponding to the set-point rotation speed. A first switch having an input can be connected to the output of the first monoflop. The first switch can be controlled by an output signal of the first monoflop. The first switch and a first capacitor can be connected to each other at a connection point where they form a series connection disposed between the output of the current generator and the reference potential. A second switch connected in parallel to the first capacitor can be connected to the output of the second monoflop and can be controlled by the output signal of the second monoflop. A first amplifier can have an input and an output. The input can be connected to the connection point of the first switch and of the first capacitor. A third switch can have a control input, an input and an output. The control input of the third switch can be connected to the output of the first monoflop. The third switch can be controlled by the output signal of the first monoflop. The input of the third switch can be connected to the output of the first amplifier. A second amplifier can have an input and an output. The input of the second amplifier can be connected to the output of the third switch. The output of the second amplifier can deliver a voltage proportional to the period duration of the rotation-speed measurement-device output frequency with reference to the rotation-speed set-point value. A second capacitor can have an input and an output. The input of the second capacitor can be connected to the output of the third switch. The output of the second capacitor can be connected to a reference potential.

The first switch can be provided as an electronic normally closed switch circuit. The second switch as well as the third switch can be formed as electronic normally open switch circuit furnishing switching control with normally-open contacts.

The multiplier can have a second input. The current generator of the time period/voltage converter circuit can have a control input connected to the output of the frequency/voltage converter. The output of the frequency/voltage converter can be connected to the second input of the multiplier.

A differentiator circuit can have an input and an output. The input of the differentiator circuit can be connected to the output of the time period/voltage converter circuit for delivering of the voltage proportional to the period-duration of the rotation-speed measurement-device output pulse sequence with reference to the rotation-speed set-point value. The output of the differentiator circuit can be connected to the second input of the summator. A digital delay circuit can have a first input connected to the output of the rotation speed measurement device, a second input can receive rotation speed set point signals, a first output can be connected to the first input of the up/down counter and can have a second output connected to the second input of the up/down counter, such that the digital delay circuit can be disposed to receive the actual rotation-speed pulse sequence ($f_i$) and the set-point rotation-speed pulse sequence ($f_n$), and to deliver delayed output to the up-down counter for preventing pulse overlapping.

The delay circuit can comprise a first flipflop having a clock cycle input, a data input, and a signal output. An actual rotation-speed pulse sequence ($f_i$) can be fed to the data input of the first flipflop. A second flipflop can have a clock cycle input, a data input, and a signal output. A set-point rotation-speed pulse sequence ($f_n$) can be fed to the data input of the second flipflop. An output of a square-wave generator can be connected to the clock cycle input of the first flipflop. The output of the square-wave generator can provide a clock cycle frequency, which can be substantially higher than the maximum rotation-speed-dependent pulse frequency and where the signal output of the first flipflop is connected to the first input of the up/down counter and where the signal output of the second flipflop is connected to the second input of the up/down counter. The first and second input of the up/down counter can be coordinated to the two counting directions of the up/down counter. An inverter can have an input connected to the output of the square-wave generator and an output connected to the clock cycle input of the second flipflop.

The counting value of the up/down counter can be limited in both directions for preventing an overflow of the counter.

An electronic threshold switch can have an input and an output. The input of the electronic threshold switch can be connected to the output of the digital to analog converter. The output of the threshold switch can deliver an alarm signal upon reaching of a preset threshold value.

According to the invention, there is provided a method for digital speed control of an asynchronous motor fed via a static converter. The rotation speed of a motor is measured with a rotation speed measurement device having an output and coupled with the motor. A first pulse sequence is delivered from the rotation speed measurement device. This first pulse sequence is proportional in its frequency to the actual rotation speed of the motor. The first pulse sequence delivered by the rotation speed measurement device is fed to a first input of a digital up/down counter. The digital up/down counter has a first input connected to the output of the rotation speed measurement device, has a second input, and has an output. A second pulse sequence $f_n$ for setting the set-point rotation speed is fed to the second input of the digital up/down counter. A digital signal is supplied at the output of the up/down counter in case of coinciding first input-pulse sequence and second input-pulse frequencies. This digital signal at the output of the up/down counter deviates from the mean value of a counter by an amount depending on the load, while during frequency deviation, a digital rotation-speed error signal occurs deviating upwardly or downwardly from this value of the up/down counter. An output signal is passed from the up/down counter to a digital to analog converter having an input connected to the output of the up/down counter and having an output, where the digital to analog converter follows the up/- down counter output. A voltage depending on the rotation-speed set-point value ($f_n$) and on the period duration ($1/f_i$) of the rotation-speed measurement-device output signal ($f_i$) is fed to a second input of a summator. The summator has a first input and a second input and an output, where the output of the digital to analog converter is placed in connection with the first input of the summator. A pulse sequence ($f_n$), corresponding to a set-point rotation speed, is fed to a first input of a frequency/voltage converter. The frequency voltage converter has a first input, a second input and an output. The output of the frequency/voltage converter is connected to the other input of a multiplier. Said multiplier has a first input and an output, where an output of the summator is connected to the first input of a multiplier. A voltage, proportional to the set-point rotation speed ($f_n$), is fed from the output of the frequency/voltage converter to the multiplier. An output signal of the digital to analog converter is compared with a voltage proportional to a set-point rotation speed via the voltage/frequency converter for obtaining a static power converter control signal. The voltage/frequency converter has an input and an output, where the output of the multiplier is connected to the input of the voltage/frequency converter and where the output of the voltage/frequency converter is connected to the input of a static power converter. The static power converter control signal is delivered to the static power converter having an input and an output. An output power is supplied from the static power converter to the motor connected to the output of the static power converter.

An output voltage depending both on the rotation-speed set-point value ($f_n$) as well as on the period duration ($1/f_i$) of a rotation-speed measurement-device output signal ($f_i$) can be fed to a time period/voltage converter circuit having a first input, a second input, and an output. The first input of the time period voltage converter circuit can be connected to the output of the frequency/voltage converter. The second input of the time period voltage converter circuit can be connected to the rotation-speed measurement device, while the output of the time period voltage converter circuit can be connected to the second input of the summator.

An output signal furnished to the up-down counter can be delayed for preventing pulse overlapping in a digital delay circuit. The digital delay circuit can have a first input connected to the output of the rotation speed measurement device, the digital delay circuit can have a second input receiving rotation speed set point signals. A first output of the digital delay circuit can be connected to the first input of the up/down counter and have a second output connected to the second input of the up/down counter. In this manner, the digital delay circuit can be disposed to receive the actual rotation-speed pulse sequence ($f_i$) and the set-point rotation-speed pulse sequence ($f_n$).

An actual rotation-speed pulse sequence ($f_i$) can be fed to a data input of a first flipflop of the delay circuit. The first flipflop can have a clock cycle input, a data input and a signal output. A set-point rotation-speed pulse sequence ($f_n$) can be fed to a data input of a second flipflop. The second flipflop can have a clock cycle input, the data input, and a signal output. An output of a square-wave generator can be connected to the clock cycle input of the first flipflop. The output of the square-wave generator can provide a clock cycle frequency, which can be substantially higher than the maximum rotation-speed-dependent pulse frequency.

The signal output of the first flipflop can be connected to the first input of the up/down counter. The signal output of the second flipflop can be connected to the second input of the up/down counter. The first and second input of the up/down counter can be coordinated to the two counting directions of the up/down counter. An inverter can have an input connected to the output of the square-wave generator and an output connected to the clock cycle input of the second flipflop.

The counting value of the up/down counter can be limited in both directions for preventing an overflow of the counter.

An alarm signal can be delivered upon reaching of a preset threshold value at an output of an electronic threshold switch. The electronic threshold switch can have an input and an output. The input of the electronic threshold switch can be connected to the output of the digital to analog converter.

The circuit taught in U.S. Pat. No. 3,887,853 compares, as recited, the actual rotation-speed pulse sequence with the rotation-speed set point value pulse sequence after a digital to analog conversion. For this purpose, an averaging of a multitude of pulse intervals is indispensible. This means that a corresponding time delay or time constant is present in the control circuit. In order to avoid this and in order to achieve an immediate and thus phase-locked control, the present invention discloses not to compare the mean value of the pulse frequency of the actual value pulse with the set-point value, but instead employs, for this comparison, the reciprocal value of the frequency, i.e. the period duration of the actual-value pulse sequence. This period duration can be measured within one single pulse interval and thus does not require any time-delaying averaging over a multitude of pulses. This substantially improves the control behavior and, in particular, renders it free of delays. Thus, a special internal inverse or negative feedback circuit for suppression of oscillations can be eliminated.

Switching arrangements for the measurement of the frequency of an electric signal are known. For example, the Swiss Patent CH-PS 521,591 illustrates such a device, where in a first phase an integrator is loaded to a voltage value, which is proportional to the period duration of the signal. In a following phase, the integrator voltage, achieved at the end of the first phase, is stored and this stored voltage is converted by way of a processor counter into a voltage proportional to the frequency of the signal. Finally, the integrator is discharged in a third phase. A further frequency/voltage converter is described in the British Patent Application GB-OS 2,008,874. The circuits characterized in the respective sub-claims for these purposes have proved to be particularly reliable and economic.

It is further favorable, in view of the overall expenditures, that only a digital rotation-speed measurement device is required for capturing the rotation speed and that no additional analog rotation-speed measurement device is required for the fine control of the rotation speed. In contrast, the duration of a period of the actual-pulse sequence, delivered by the digital rotation-speed measurement device, is continuously measured within the framework of the present invention. In order to achieve a sufficiently dynamic control, even in case of very low actual rotation speeds, the period-duration measurement circuit delivers a period-duration signal in relation to the set-point rotation speed. Thus, the output voltage of the period duration/voltage converter remains constant as long as the rotation-speed actual value and the rotation-speed set-point value coincide. In case of a deviation thereof, there results a corresponding relative change, i.e. referring to the rotation-speed set-point value, of the output voltage of the inverter. Over the complete rotation-speed control region, there is achived a dependency of the conrol signal exclusively on the slippage, i.e. on the load, and thus the desired control stability. The automatic control device according to the invention is associated with the further advantage that possible phase-swinging or rotation pendulum vibrations of the rotor can be effectively suppressed without a particular inverse or negative feedback and-/or filter circuit simply by changing the circuit amplification of the control circuit. Problems with a possible falling out of phase of the synchronous rotation speed are eliminated. The asynchronous motor controlled according to the invention runs with a full torque into the synchronous rotation speed.

The novel features which are considered as characteristic for the invention are set forth in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

In the accompanying drawing, in which are shown several of the various possible embodiments of the present invention.

DESCRIPTION OF INVENTION AND PREFERRED EMBODIMENT

Figure 1:
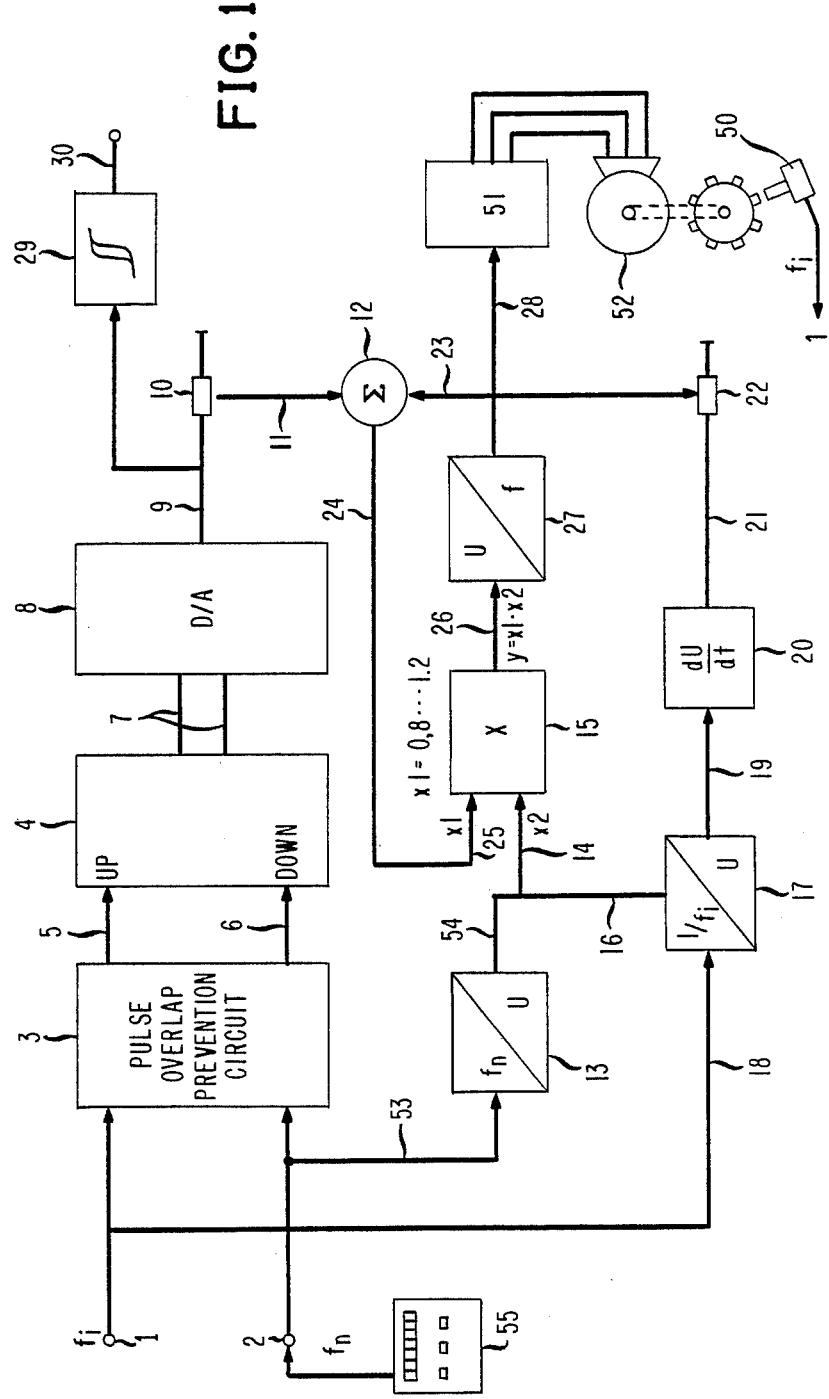
FIG. 1 is a block-circuit diagram of the circuit according to the invention.

According to the invention there is provided a device for digital speed control of an asynchronous motor fed via a static converter. A pulse sequence $f_n$, setting the set-point rotation speed, and a pulse sequence $f_i$ delivered by a rotation-speed measurement device 50 coupled with the motor 52, which is proportional in its frequency to the actual rotation speed, is fed to two inputs 5 and 6 of a digital up/down counter 4. At the output 7 of the counter, in case of coinciding input-pulse sequence frequencies, a digital signal is provided, which deviates from the mean value of a counter by an amount depending on the load, while during frequency deviation, a digital rotation-speed error signal occurs deviating upwardly or downwardly from this counter value. A digital to analog converter 8 follows the counter output 7. The output signal of the digital to analog converter delivers the digital control signal for the converter after comparison with a voltage proportional to a set-point rotation speed via a voltage/frequency converter. An output 9 of the digital to analog converter 8 is placed in connection with a first input 11 of a summator 12. A voltage depending on the rotation-speed set-point value $f_n$ and on the period duration $1/f_i$ of the rotation-speed measurement-device output signal $f_i$ is fed to a second input 23 of the summator 12. An output 24 of the summator 12 is connected to a second input 25 of a multiplier 15. The pulse sequence $f_n$, corresponding to the set-point rotation speed, is fed to an input 53 of a frequency/voltage converter 13. The output 54 of the frequency/voltage converter 13 is connected to the other input 14 of the multiplier 15 and the output 54 feeds a voltage, proportional to the set-point rotation speed $f_n$, to the multiplier 15. The output 26 of the multiplier 15 is connected with the voltage/frequency converter 27.

A converter circuit 17, delivering a voltage depending both on the rotation-speed set-point value $f_n$ as well as on the period duration $1/f_i$ of the rotation-speed measurement-device output signal $f_i$, can be connected with a first reference signal control input 16 to the output 54 of the frequency/voltage converter 13 and with a second control input 18 to the rotation-speed measurement device 50, while the output 19 of this converter circuit 17 can be connected to the second input 23 of the summator 12.

The period duration measurement converter circuit 17 can comprise the following. Two monoflops 32, 33 connected in series, of which the first monoflop 32 can receive as an input signal the pulse sequence $f_i$ of the rotation-speed measurement device 50 corresponding to the actual rotation speed. A current generator 31 can deliver a current $I_n$ corresponding to the set-point rotation speed. A series connection disposed between the output of the current generator and the reference potential can comprise a first electronic switch 35 controlled by the output signal of the first monoflop 32 and a first capacitor C1. A second electronic switch 36 can be connected in parallel to the first capacitor C1 and can be controlled by the output signal of the second monoflop 33. A first amplifier 39 can be connected on the input side at the connection point 38 of the first electronic switch 35 and of the first capacitor C1. A third electronic switch 40 can be connected in between the output of the first amplifier 39 and the input 42 of the following second amplifier 41. The third electronic switch 40 can be controlled by the output signal of the first monoflop 32. A second capacitor C2 can be connected between the input 42 of the second amplifier 41 and the reference potential. An output 19 of the second amplifier can deliver a voltage proportional to the period duration of the rotation-speed measurement-device output frequency with reference to the rotation-speed set-point value.

The first electronic switch 35 can be provided as an electronic normally closed switch and the second electronic switch 36 as well as the third electronic switch 40 can be formed as electronic current closing connection furnishing switching control with normally-open contacts.

The current generator 31 having a reference signal control input 16 can be connected to the output 54 of the frequency/voltage converter 13, where the output 54 can be connected with the other input 14 of the multiplier 15.

A differentiator circuit 20 can be connected between the converter circuit 17 for delivering of the voltage proportional to the period-duration of the rotation-speed measurement-device output pulse sequence with reference to the rotation-speed set-point value and the second input 23 of the summator 12.

Between the inputs 1, 2, delivering the actual rotation-speed pulse sequence $f_i$ and the set-point rotation-speed pulse sequence $f_n$, and the up-down counter 4, there can be connected a digital delay and overlap-blocking circuit 3 preventing pulse overlapping.

The actual rotation-speed pulse sequence $f_i$ can be fed to the data input D1 of the first flipflop 43, and the set-point rotation-speed pulse sequence $f_n$ can be fed to the data input D2 of a second flipflop 44. The output of a square-wave generator 46, which can provide a cycle frequency, which can be substantially higher than the maximum rotation-speed-dependent pulse frequency, can be connected to the cycle pulse input C11 of the first flipflop 43 and can be connected via an inverter 45 to the cycle pulse input C12 of the second flipflop 44. The signal output Q1, Q2 of the two flipflops 43, 44 can be connected to the counter inputs 5, 6 coordinated to the two counting directions of the up/down counter 4.

The counting value of the up/down counter 4 can be limited in both directions and an overflow of the counter can thus be prevented.

An electronic threshold switching element 29 can be connected to the output 9 of the digital to analog converter 8. Said threshold switching element 29 delivers an alarm signal at 30 upon reaching of a preset threshold value.

FIG. 1 illustrates a pulse sequence with the frequency $f_I$ proportional to the rotations generated by a rotation-speed pulse transmitter 50 capturing the rotations of the motor shaft, which pulse sequence corresponds to the actual value of the motor speed. The pulse sequence is delivered to the first input 1 of a digital-delay and-overlap-blocking circuit 3, to be described in the following, for preventing of pulse overlaps, which precedes the up/down counter 4. Construction and function of the overlap-blocking device 3 are illustrated further down by way of FIGS. 3a and 3b. At this point, the circuit arrangement is considered not to be present, i.e. the inputs 1 and 2 are considered to be connected immediately with the counter inputs 5 and 6. A pulse sequence with the frequency $f_n$, proportional in its frequency to the rotation-speed set-point value and delivered by a set-point generator 55, passes to the second input 2 of the overlap-blocking device 3. The 8-bit up/down counter 4 delivers at its eight output lines 7, in case of conformity of $f_i$ and $f_n$, a digital signal depending only on the torque, i.e. depending on the load, to the digital to analog converter 8. In case of the absence of a load, this signal corresponds to the mean counter state 128. If the actual rotation speed, and thus the frequency $f_i$, deviates from the set-point value $f_n$, then the state of the counter changes in case of a motor speed that is too low in the direction of the counter state Zero and in case of an actual rotation speed that is too high in the direction of the maximum counter state 255. The counter state is limited in both directions, i.e. an overflow and a thereby resulting resetting of the counter is prevented. Corresponding to the change of the counter state, the digital output signal on the lines 7 changes and thus the analog output signal of the converter 8 at its output 9. The output signal passes via an adjuster 10, represented as a potentiometer, to a first input 11 of a summator 12. This is also an analog signal proportional to the integral of the rotation-speed control deviation. In case of a conformity of the actual value and the set-point value, the analog voltage is, for example, +5 volts, whereas the analog voltage changes between 0 volt and +10 volts in case of the presence of an automatic control deviation.

The frequency $f_n$, corresponding to the rotation-speed set-point value, is fed in addition via the input line 53 to a frequency/voltage converter 13, which delivers from its output 54 an analog signal corresponding to the rotation-speed set-point value on the one hand to the first input 14 of a multiplier 15 and, on the other hand, to a reference signal input 16 of a period-duration/voltage converter circuit 17. The control input 18 of the converter contains the actual-value pulse sequence $f_i$ from the input 1. Construction and mode of operation of this converter circuit 17 will be explained in detail further down by way of FIGS. 2a and 2b. The converter circuit 17 provides at its output 19 a signal related to the set-point value $f_n$ and depending on the period duration $T_i = 1/f_i$ to the differentiator circuit 20. The output 21 of the differentiator circuit 20 is in connection via a second adjuster 22, again represented as a potentiometer, with the second input 23 of the summator 12. The summator 12 thus receives a signal depending on the period duration, i.e. on the time spacing of the rotation-speed actual-value pulses and referring to the rotation-speed set-point value. The interconnection of a differentiator circuit 20 has proven to be advantageous in view of an improvement of the control behavior (D-contribution). In itself, the output line 19 could also be connected immediately to the input 23 of the summator. The influence of the output signal of the converter circuit 17 can be adapted with the adjuster 22 on the signal provided in the summator 12 and can be adapted to the condition of the motor and its load.

The output signal of the summator 12 passes via the output line 24 to the second input 25 of the multiplier 15. A signal $f_n$, corresponding to the set-point rotation speed, is fed to the first input of the multiplier 15. Thus, an analog voltage is present at the output 26 of the multiplier 15, which is derived by multiplication from the rotation-speed set-point value and the rotation-speed control deviation. The analog voltage is transformed in the voltage/frequency converter 27 into the digital output control signal of the control device, which is fed as a control signal via the output 28 to the static converter 51, which feeds the motor 52 to be controlled in its rotation speed.

An electronic threshold switching element 29 is connected at the output 9 of the digital to analog converter 8, which electronic threshold switching element 29 delivers at its output 30 an alarm signal announcing an out of synchronism situation of the motor control, as soon as the counter state of the counter 4 approaches the upper or the lower limit value.

Figure 2A:
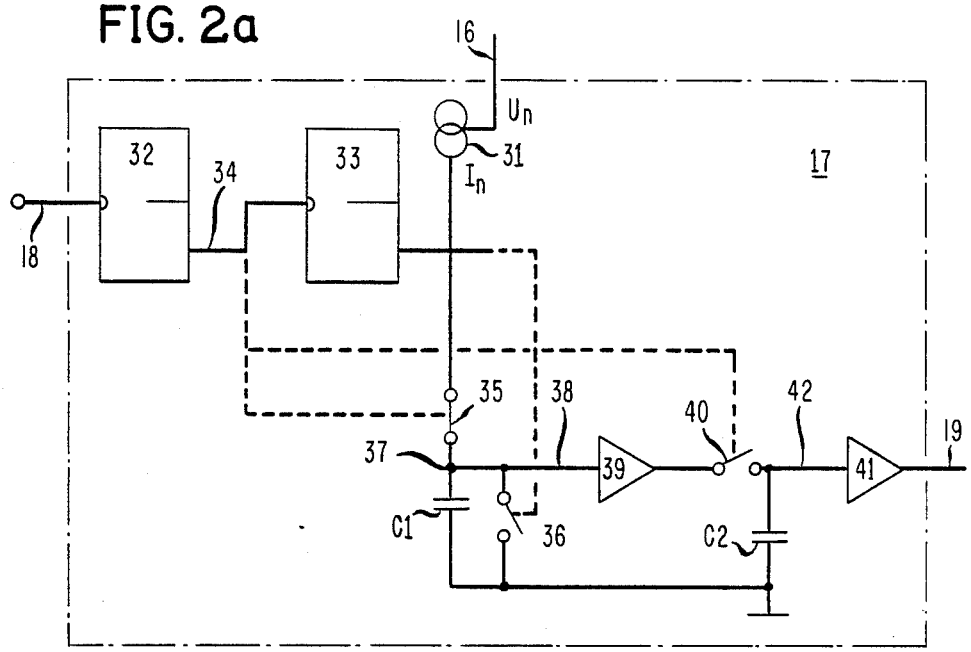
FIG. 2a is a circuit representation of the circuit arrangement for measurement of the period duration.

FIG. 2a illustrates an embodiment of a period-duration measurement and converter circuit 17. The rotation-speed actual-value pulse sequence $f_i$ is present at its control input 18 and a voltage $U_n$ proportional to the rotation-speed set-point value is present at the reference signal control input 16, where the proportional voltage $U_n$ is fed to a controllable current generator. Such generator circuits are known. The controllable current generator generates a direct current $I_n$ proportional to the rotational-speed set-point value for the charging of the capacitor C1. A first monoflop 32 and a second monoflop 33 are connected in series at the control input 18. The output signal M32, placed on the connection line 34 between the two monoflops, controls an electronic switch 35, provided as an normally closed switch connection, in the charging current circuit of the capacitor C1. An electronic normally open switch 36 is connected in parallel to the capacitor C1 and in series to the electronic switch 35. The electronic switch 36 is controlled by the output signal M33 of the second monoflop 33. These control connections are indicated in FIG. 2A by dotted lines. The input 38 of a first amplifier 39 is connected at the connection point 37 of the electronic switch 35, of the electronic switch 36, and of the first capacitor C1, which amplifier 39 is followed via a third electronic switch 40, provided as a circuit-closing connection, by a second amplifier 41. The third electronic switch 40 is controlled, just as the first electronic switch 35, by the output signal M32 of the first monoflop 32. A second capacitor C2 is connected between the input 42 of the second amplifier and ground. In addition, the connection point, remote from the amplifier input 38 of the first capacitor C1 and the second electronic switch 36, is connected to ground.

This circuit arrangement operates as follows. The impulse sequence $f_i$, corresponding to the actual rotation speed, passes to the control input 18, compare FIG. 2b, upper curved line. The monoflop 32 derives an output signal M32 from the first rising edge. This output signal M32 opens the electronic switch 35 and closes the electronic switch 40. The charging of the capacitor is interrupted and the charge of the capacitor C1 via the amplifier 39 is transferred to the capacitor C2. At the end of the output signal M32, the two electronic switches 35 and 40 switch again back into the starting position illustrated in the drawing. Thus, the capacitor C2 is separated from the output of the amplifier 39. At the same time, the electronic switch 36 is closed for a short time by the output signal M33 of the second monoflop 33 following in immediate sequence, and the capacitor C1 is discharged. As soon as the electronic switch 36 is open again, the charging of the capacitor C1 commences anew from the generator 31. Thus, the voltage course $U_{C1}$ of saw-tooth shape, represented in the fourth line of FIG. 2b, results at the capacitor C1, where the steepness of the rising slope is proportional to the current of the generator 31, and thus to the rotation-speed set-point value. In each case, the attained peak value of the voltage $U_{C1}$ is transferred to the capacitor C2 such that the direct current voltage $U_{C2}$ is set there, as illustrated in the lowermost curve plot course shown in FIG. 2b. The direct current voltage $U_{C2}$ can be picked up behind the unity amplifier 41 at the output 19 and it is proportional to the period duration of the actual-value pulse sequence and simultaneously is related to the set-point rotation speed.

Figure 2B:
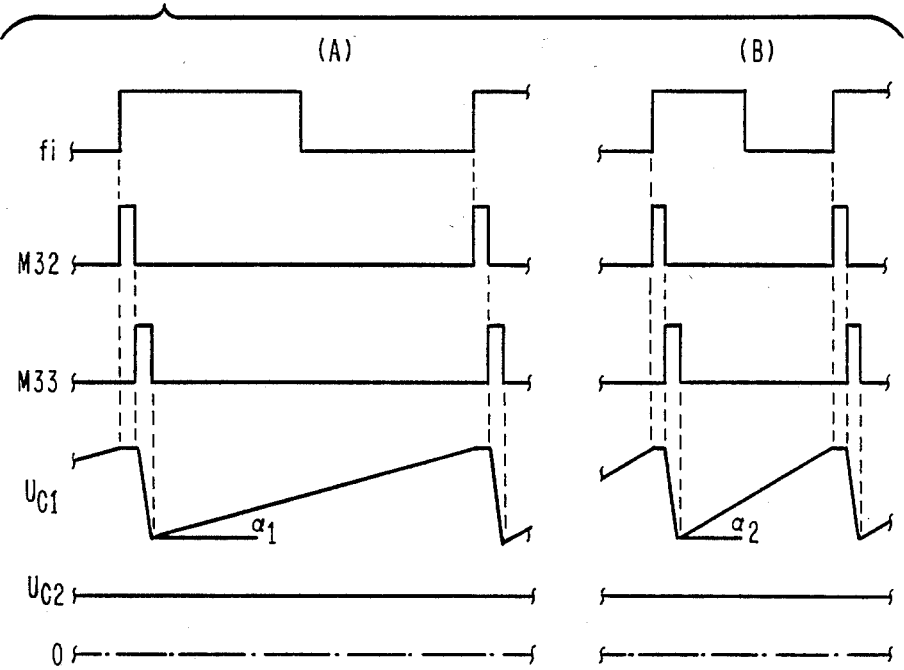
FIG. 2b is a diagram illustrating the signal course at several points of this circuit.

A comparison between the two curve courses represented to the left and to the right in FIG. 2b illustrates that the height level of the output voltage $U_{C2}$ is not dependent on the fact of whether the motor runs with a high or low rotation speed, as long as the relative rotation-speed deviation, i.e. the rotation speed deviation with reference to the set-point value is about equal. In the left part (A), the rotation speed is low, i.e. the time distance of the actual-value pulse $f_i$ is fairly large. Thus, in fact the charging time of the capacitor C1 available between two pulses is correspondingly long. At the same time, however, the charging current of the generator derived from the set-point value is correspondingly low. If one considers now the situation illustrated on the right under (B), where both the rotation-speed actual value, i.e. the frequency $f_i$, as well as the set-point value are about twice as large as on the left-hand side, then there results at the same time the same maximum value of the charge voltage at the capacitor C1 and thus also the output voltage $U_{C2}$, based on the increased charging current and recognizable from the increased steepness of the charge voltage current $U_{C1}$.

Figure 3A:
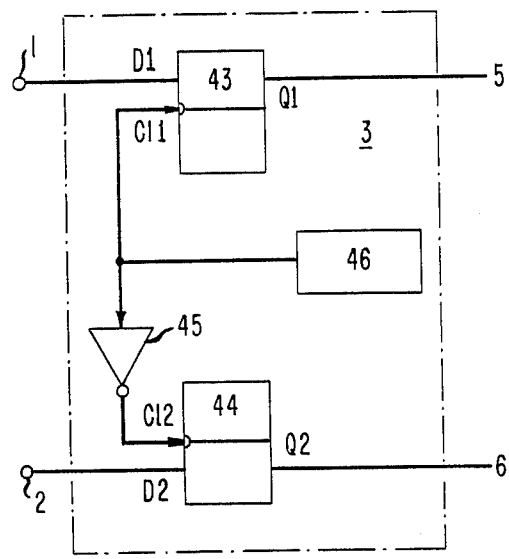
FIG. 3a is a diagram illustrating the circuit arrangement for preventing of overlaps of the pulse sequences fed to the up/down counter.

The pulse overlap blocking device 3, inserted between the inputs 1 and 2 of the controller and the counter inputs 5 and 6 of the up/down counter 4, is to prevent that simultaneously an actual-value pulse and a set-point value pulse are fed to the counter and that the counter thus cannot decide in which direction it is to proceed. An embodiment of such overlap-blocking device, provided as a digital delay circuit, is illustrated in FIG. 3a. The overlap-blocking device 3 comprises two D flipflops 43 and 44, an inverter 45, and a square-wave generator 46, where the frequency of the square-wave generator is by a multiple higher than the maximum pulse-sequence frequency $f_n$ to be expected corresponding to the maximum rotation-speed set-point value. The actual-value pulses $f_i$, generated by the digital rotation-speed measurement device, pass via the input 1 to the data input D1 of the first flipflop 43. The square-wave generator 46 delivers its cycle pulse sequence PC11 on the one hand immediately to the cycle pulse input C11 of the first flipflop 43 and, on the other hand, via the inverter 45 as an inverted cycle pulse sequence PC12 to the equally designated cycle pulse input of the second flipflop 44. The data input D2 of the second flipflop 44 is connected via the input 2 to the digital set-point generator, which provides a pulse sequence with the sequence rate $f_n$.

Figure 3B:
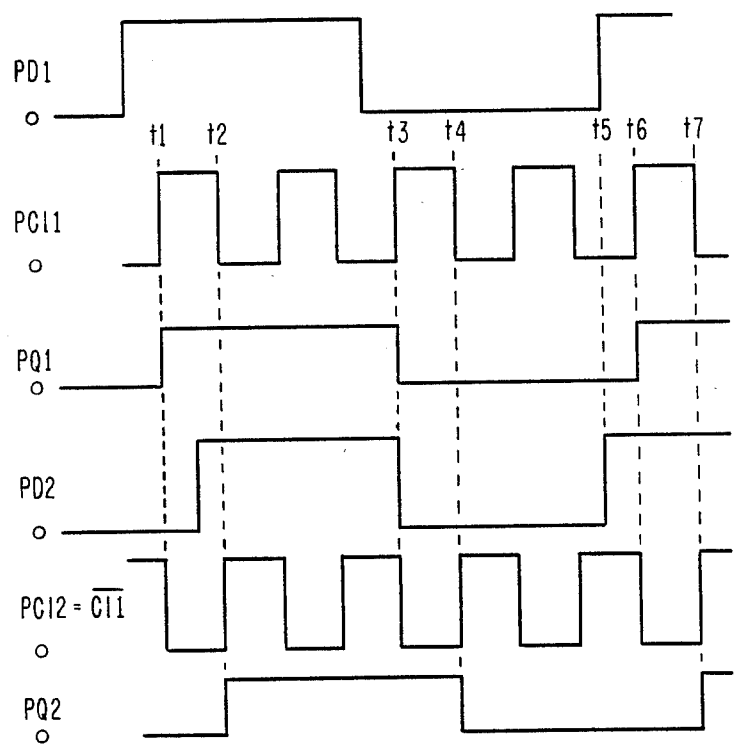
FIG. 3b is a diagram illustrating the signal course at several circuit points.

The mode of operation is illustrated in FIG. 3b. Each flipflop then switches respectively its output potential Q1 or, respectively, Q2 from "0" to "1" if the rising leading edge of a generator pulse PC11 or, respectively, PC12, fed to its cycle-pulse input C11 or C12 encounters a positive signal "1" of its input signal PD1 or, respectively, PD2 fed to its data input. The switching back of the output signals Q from "1" to "0" is performed if a rising leading edge of the cycle-pulse signal encounters a signal "0" at the data input D1 or D2 of the respective flipflop. The output Q1 is connected with the first counter input 5 and with the output Q2 via the counter input line 6 with the other second input of the up/down counter 4. If the upper part of FIG. 3b is initially considered, then the switching of Q1 from "0" to "1" occurs at the point in time t1 and the switching back occurs at the point in time t3. One recognizes in the lower part that the positive switching of Q2 occurs at the point in time t2 and the switching back occurs at the point in time t4. Thus, no overlapping of the output signals Q1 and Q2 is present, especially since at no point the front or rear slopes of the input pulses PD1 and PD2 coincide in time. In contrast, a rising leading edge occurs at the point in time t5 simultaneously in the two input signals PD1 and PD2. If the two signals would be fed unchanged to the counter 4, then this counter would receive at this point in time simultaneously the order to count one step ahead and one step back. This however is prevented by the overlap-blocking device. The switching of the signal output Q1 occurs in fact only at the point in time t6 and the switching of the signal output Q2 occurs at the point in time t7. Thus, again no overlapping is present. Clearly processable switching orders are thus furnished at the counter inputs 5 and 6 to the counter 4.

The rotation-speed automatic control has an ID behavior, where the I part is formed by the difference of actual value and set-point value integrated on the counter 4. This difference corresponds to the rotor displacement angle of a synchronous machine. The larger the load, the larger is this integral and the larger the slippage-frequency adjustment has to be. In order to make this slippage-frequency adjustment independent of the rotation speed which is present, each error integral generates the same relative frequency change of the control pulses fed to the converter. Thus, one obtains always the same rotor-displacement angle, in other words, a kind of phase locking. The circuit amplification of the automatic control circuit can be changed with the adjuster 10 in order to eliminate a possible tendency to oscillation. The phase swinging or pendulum oscillations of the rotor observed frequently with motor-speed controls thus can be supressed with simple means.

It will be understood that each of the elements described above, or two or more together, may also find a useful application in other types of rotation-speed control devices differing from the types described above.

While the invention has been illustrated and described as embodied in the context of a speed control device of an asynchronous motor, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

I claim:

1. A device for digital speed control of an asynchronous motor fed via a static power converter comprising
    a static power converter having an input and an output;
    a motor connected to the output of the static power converter;
    a rotation speed measurement device having an output and coupled with the motor and delivering a first pulse sequence, which first pulse sequence is proportional in its frequency to the actual rotation speed;
    a digital up/down counter including a signal coincidence determining means having a first input connected to the output of the rotation speed measurement device, having a second input, and having an output, where the first pulse sequence delivered by the rotation-speed measurement device is fed to a first input of the digital up/down counter and where a second pulse sequence $f_n$, for setting the set-point rotation speed, is fed to the second input of the digital up/down counter, where a digital signal is provided at the output of the up/down counter in case of coinciding first input-pulse sequence and second input-pulse frequencies as determined by the signal coincidence determining means, which digital signal at the output of the up/down counter deviates from the mean value of a counter by an amount depending on the load while, during frequency deviation, a digital rotation-speed error signal occurs deviating upwardly or downwardly from this value of the up/down counter;
    a digital to analog converter having an input connected to the output of the up/down counter and having an output, where the digital to analog converter follows the up/down counter output;
    a summator having a first input and a second input and an output, where the output of the digital to analog converter is placed in connection with a first input of the summator and where a voltage, depending on the rotation-speed set-point value ($f_n$) and on the period duration ($1/f_i$) of the rotation-speed measurement-device output signal ($f_i$) fed to the second input of the summator;
    a multiplier having a first input and an output, where an output of the summator is connected to the first input of a multiplier;
    a frequency voltage converter having a first input, a second input and having an output, where a pulse sequence ($f_n$), corresponding to a set-point rotation speed, is fed to the first input of the frequency/voltage converter and where the output of the frequency/voltage converter is connected to the other input of the multiplier and the output of the frequency/voltage converter feeds a voltage, proportional to the set-point rotation speed ($f_n$), to the multiplier; a voltage/frequency converter having an input and having an output, where the output of the multiplier is connected to the input of the voltage/frequency converter and where the output of the voltage/frequency converter is connected to the input of the static power converter and where the output signal of the digital to analog converter delivers the digital control signal for the converter static power converter after comparison with a voltage proportional to a set-point rotation speed via the voltage/frequency converter.

2. The device for digital speed control according to claim 1 further comprising
    a time period voltage converter circuit having a first input, a second input and an output, wherein the first input of the time period voltage converter circuit is connected to the output of the frequency/voltage converter and where the second input of the time period voltage converter circuit is connected to the rotation-speed measurement device for delivering an output voltage depending both on the rotation-speed set-point value ($f_n$) as well as on the period duration ($1/f_i$) of a rotation-speed measurement-device output signal ($f_i$), while the output of the time period voltage converter circuit is connected to the second input of the summator.

3. The device for digital speed control according to claim 2, wherein the time period voltage converter circuit comprises
    a first monoflop having an input and an output and receiving at the input as an input signal the pulse sequence ($f_i$) of the rotation-speed measurement device corresponding to the actual rotation speed;
    a second monoflop having an output and connected in series to the first monoflop;
    a current generator delivering a current ($I_n$) corresponding to the set-point rotation speed;
    a first switch having an input connected to the output of the first monoflop, where the first switch is controlled by an output signal of the first monoflop;
    a first capacitor, where the first switch and the first capacitor are connected to each other at a connection point and where they form a series connection disposed between the output of the current generator and the reference potential;

a second switch connected in parallel to the first capacitor and connected to the output of the second monoflop and controlled by the output signal of the second monoflop; a first amplifier having an input and an output, where the input is connected to the connection point of the first switch and of the first capacitor;

a third switch having a control input, an input and an output, where the control input of the third switch is connected to the output of the first monoflop and where the third switch is controlled by the output signal of the first monoflop, and where the input of the third switch is connected to the output of the first amplifier;

a second amplifier having an input and an output, where the input of the second amplifier is connected to the output of the third switch and where the output of the second amplifier delivers a voltage proportional to the period duration of the rotation-speed measurement-device output frequency with reference to the rotation-speed set-point value;

a second capacitor having an input and an output where the input of the second capacitor is connected to the output of the third switch and where the output of the second capacitor is connected to a reference potential.

4. The device for digital speed control according to claim 3, wherein
the first switch is provided as an electronic idle-current connection and where the second switch as well as the third switch are formed as electronic current closing connection furnishing switching control with normally-open contacts.

5. The device for digital speed control according to claim 3, wherein the multiplier has a second input and wherein the current generator of the time period voltage converter circuit has a control input connected to the output of the frequency/voltage converter and where the output of the frequency/voltage converter is connected to the second input of the multiplier.

6. The device for digital speed control according to claim 3 further comprising
a differentiator circuit having an input and having an output, where the input of the differentiator circuit is connected to the output of the time period voltage converter circuit for delivering of the voltage proportional to the period-duration of the rotation-speed measurement-device output pulse sequence with reference to the rotation-speed set-point value and where the output of the differentiator circuit is connected to the second input of the summator.

7. The device for digital speed control according to claim 1 further comprising
a digital delay circuit having a first input connected to the output of the rotation speed measurement device, a second input receiving rotation speed set point signals, a first output connected to the first input of the up/down counter and having a second output connected to the second input of the up/down counter, such that the digital delay circuit is disposed to receive the actual rotation-speed pulse sequence ($f_i$) and the set-point rotation-speed pulse sequence ($f_n$), and to deliver delayed output to the up-down counter for preventing pulse overlapping.

8. The device for digital speed control according to claim 7 wherein the delay circuit comprises
a first flipflop having a clock cycle input, having a data input and having a signal output, where an actual rotation-speed pulse sequence ($f_i$) is fed to the data input of the first flipflop;

a second flipflop having a clock cycle input, having a data input and having a signal output, where a set-point rotation-speed pulse sequence ($f_n$) is fed to the data input of the second flipflop;

a square-wave generator having an output, where the output of the square-wave generator is connected to the clock cycle input of the first flipflop, where the output of the square-wave generator provides a clock cycle frequency, which is substantially higher than the maximum rotation-speed-dependent pulse frequency and where the signal output of the first flipflop is connected to the first input of the up/down counter and where the signal output of the second flipflop is connected to the second input of the up/down counter and where the first and second input of the up/down counter are coordinated to the two counting directions of the up/down counter; and an inverter having an input connected to the output of the square-wave generator and having an output connected to the clock cycle input of the second flipflop.

9. The device for digital speed control according to claim 1, wherein the counting value of the up/down counter is limited in both directions for preventing an overflow of the counter.

10. The device for digital speed control according to claim 1 further comprising
an electronic threshold switch having an input and having an output, where the input of the electronic threshold switch is connected to the output of the digital to analog converter and where the output of the threshold switch delivers an alarm signal upon reaching of a preset threshold value.

11. A device for digital speed control of an asynchronous motor fed via a static converter, wherein
(a) a pulse sequence $f_n$, setting the set-point rotation speed, and a pulse sequence delivered by a rotation-speed measurement device coupled with the motor, which is proportional in its frequency to the actual rotation speed, is fed to two inputs of a digital up/down counter, where at the output of the counter, in case of coinciding input-pulse sequence frequencies, a digital signal is provided, which deviates from the mean value of a counter by an amount depending on the load, while during frequency deviation, a digital rotation-speed error signal occurs deviating upwardly or downwardly from this counter value;

(b) a digital to analog converter follows the counter output, where the output signal of the digital to analog converter delivers the digital control signal for the converter after comparison with a voltage proportional to a set-point rotation speed via a voltage/frequency converter, the improvement comprising (c) an output (9) of the digital to analog converter (8) is placed in connection with a first input (11) of a summator (12), said summator (12) including a signal coincidence determining means;

(d) a voltage depending on the rotation-speed set-point value ($f_n$) and on the period duration ($1/f_i$) of the rotation-speed measurement-device output signal ($f_i$) is fed to a second input (23) of the summator (12);

(e) an output (24) of the summator (12) is connected to a second input (25) of a multiplier (15);

(f) the pulse sequence ($f_n$), corresponding to the set-point rotation speed, is fed to an input (53) of a frequency/voltage converter (13);

(g) the output (54) of the frequency/voltage converter (13) is connected to the other input (14) of the multiplier (15) and the output (54) feeds a voltage, proportional to the set-point rotation speed ($f_n$), to the multiplier (15);

(h) the output (26) of the multiplier (15) is connected with the voltage/frequency converter (27) and thereby to the motor.

12. The device for digital speed control according to claim 11, wherein a converter circuit (17), delivering a voltage depending both on the rotation-speed set-point value ($f_n$) as well as on the period duration ($1/f_i$) of the rotation-speed measurement-device output signal ($f_i$), is connected with a first reference signal control input (16) to the output (54) of the frequency/voltage converter (13) and with a second control input (18) to the rotation-speed measurement device (50), while the output (19) of this converter circuit (17) is connected to the second input (23) of the summator (12).

13. The device for digital speed control according to claim 12, wherein the period duration measurement converter circuit (17) comprises (i) two monoflops (32,33) connected in series, of which the first monoflop (32) receives as an input signal the pulse sequence ($f_i$) of the rotation-speed measurement device corresponding to the actual rotation speed;

(j) a current generator (31), which delivers a current ($I_n$) corresponding to the set-point rotation speed;

(k) a series connection disposed between the output of the current generator and the reference potential, comprising a first electronic switch (35) controlled by the output signal of the first monoflop (32) and a first capacitor (C1);

(l) a second electronic switch (36) connected in parallel to the first capacitor (C1) and controlled by the output signal of the second monoflop (33);

(m) a first amplifier (39) connected on the input side at the connection point (38) of the first electronic switch (35) and of the first capacitor (C1), where a third electronic switch (40) is connected in between the output of the first amplifier (39) and the input (42) of the following second amplifier (41), where the third electronic switch (40) is controlled by the output signal of the first monoflop (32);

(n) a second capacitor (C2) connected between the input (42) of the second amplifier (41) and the reference potential, (o) an output (19) of the second amplifier for delivering a voltage proportional to the period duration of the rotation-speed measurement-device output frequency with reference to the rotation-speed set-point value.

14. The device for digital speed control according to claim 13, wherein the first electronic switch (35) is provided as an electronic idle-current connection and the second electronic switch (36) as well as the third electronic switch (40) are formed as electronic current closing connection furnishing switching control with normally-open contacts.

15. The device for digital speed control according to claim 13, wherein the current generator (31) having a reference signal control input (16) is connected to the output (54) of the frequency/voltage converter (13), where the output (54) is connected with the other input (14) of the multiplier (15).

16. The device for digital speed control according to claim 13, wherein a differentiator circuit (20) is connected between the converter circuit (17) for delivering of the voltage proportional to the period-duration of the rotation-speed measurement-device output pulse sequence with reference to the rotation-speed set-point value and the second input (23) of the summator (12).

17. The device for digital speed control according to claim 11, wherein between the inputs (1, 2), delivering the actual rotation-speed pulse sequence ($f_i$) and the set-point rotation-speed pulse sequence ($f_n$), and the up-down counter (4), there is connected a digital delay and overlap-blocking circuit (3) preventing pulse overlapping.

18. The device for digital speed control according to claim 17, wherein (p) the actual rotation-speed pulse sequence ($f_i$) is fed to the data input (D1) of the first flipflop (43), and the set-point rotation-speed pulse sequence ($f_n$) is fed to the data input (D2) of a second flipflop (44);

(q) the output of a square-wave generator (46), which provides a cycle frequency, which is substantially higher than the maximum rotation-speed-dependent pulse frequency, is connected to the cycle pulse input (C11) of the first flipflop (43) and is connected via an inverter (45) to the cycle pulse input (C12) of the second flipflop (44); and (r) the signal output (Q1, Q2) of the two flipflops (43, 44) are connected to the counter inputs (5, 6) coordinated to the two counting directions of the up-/down counter (4).

19. The device for digital speed control according to claim 11, wherein the counting value of the up/down counter (4) is limited in both directions and where an overflow of the counter is prevented.

20. The device for digital speed control according to claim 11 further comprising an electronic threshold switching element (29) connected to the output (9) of the digital to analog converter (8), which threshold switching element (29) delivers an alarm signal upon reaching of a preset threshold value.

21. A method for digital speed control of an asynchronous motor fed via a static converter comprising measuring rotation speed of a motor with a rotation speed measurement device having an output and coupled with the motor;

delivering a first pulse sequence from the rotation speed measurement device, which first pulse sequence is proportional in its frequency to the actual rotation speed of the motor;

feeding the first pulse sequence delivered by the rotation speed measurement device to a first input of a digital up/down counter, where the digital up/down counter has a first input connected to the output of the rotation speed measurement device, has a second input, and has an output;

feeding a second pulse sequence $f_n$ for setting the set-point rotation speed to the second input of the digital up/down counter;

supplying a digital signal at the output of the up-/down counter in case of coinciding first input-pulse sequence and second input-pulse frequencies, which digital signal at the output of the up/down counter deviates from the mean value of a counter by an amount depending on the load, while during frequency deviation, a digital rotation-speed error signal occurs deviating upwardly or downwardly from this value of the up/down counter;

passing an output signal from the up/down counter to a digital to analog converter having an input connected to the output of the up/down counter and having an output, where the digital to analog converter follows the up/down counter output;

feeding a voltage depending on the rotation-speed set-point value ($f_n$) and on the period duration ($1/f_i$) of the rotation-speed measurement-device output signal ($f_i$) to a second output of a summator wherein the summator has a first input and a second input and an output, where the output of the digital to analog converter is placed in connection with the first input of the summator;

feeding a pulse sequence ($f_n$), corresponding to a set-point rotation speed, to a first input of a frequency/voltage converter where the frequency voltage converter has a first input, a second input and an output, and where the output of the frequency/voltage converter is connected to the other input of a multiplier, said multiplier having a first input and an output, where an output of the summator is connected to the first input of a multiplier;

feeding a voltage, proportional to the set-point rotation speed ($f_n$), from the output of the frequency/voltage converter to the multiplier;

comparing an output signal of the digital to analog converter with a voltage proportional to a set-point rotation speed via the voltage/frequency converter for obtaining a static power converter control signal, where the voltage/frequency converter has an input and an output, where the output of the multiplier is connected to the input of the voltage/frequency converter and where the output of the voltage/frequency converter is connected to the input of a static power converter;

delivering the static power converter control signal to the static power converter having an input and an output;

supplying an output power from the static power converter to the motor connected to the output of the static power converter.

22. The method for digital speed control according to claim 21 further comprising the step of feeding an output voltage depending both on the rotation-speed set-point value ($f_n$) as well as on the period duration ($1/f_i$) of a rotation-speed measurement-device output signal ($f_i$) to a time period voltage converter circuit having a first input, a second input and an output, wherein the first input of the time period voltage converter circuit is connected to the output of the frequency/voltage converter and where the second input of the time period voltage converter circuit is connected to the rotation-speed measurement device, while the output of the time period voltage converter circuit is connected to the second input of the summator.

23. The method for digital speed control according to claim 21 further comprising the step delaying an output signal furnished to the up-down counter for preventing pulse overlapping in a digital delay circuit having a first input connected to the output of the rotation speed measurement device, a second input receiving rotation speed set point signals, a first output connected to the first input of the up/down counter and having a second output connected to the second input of the up/down counter, such that the digital delay circuit is disposed to receive the actual rotation-speed pulse sequence ($f_i$) and the set-point rotation-speed pulse sequence ($f_n$).

24. The method for digital speed control according to claim 23 further comprising the step feeding an actual rotation-speed pulse sequence ($f_i$) to a data input of a first flipflop of the delay circuit, where the first flipflop has a clock cycle input, a data input and a signal output;

feeding a set-point rotation-speed pulse sequence ($f_n$) to a data input of a second flipflop where the second flipflop has a clock cycle input, the data input and a signal output, and where a square-wave generator has an output, where the output of the square-wave generator is connected to the clock cycle input of the first flipflop, where the output of the square-wave generator provides a clock cycle frequency, which is substantially higher than the maximum rotation-speed-dependent pulse frequency and where the signal output of the first flipflop is connected to the first input of the up/down counter and where the signal output of the second flipflop is connected to the second input of the up/down counter and where the first and second input of the up/down counter are coordinated to the two counting directions of the up/down counter, and where an inverter having an input is connected to the output of the square-wave generator and having an output connected to the clock cycle input of the second flipflop.

25. The method for digital speed control according to claim 21 further comprising the step limiting the counting value of the up/down counter in both directions for preventing an overflow of the counter.

26. The method for digital speed control according to claim 21 further comprising delivering an alarm signal upon reaching of a preset threshold value at an output of an electronic threshold switch, where the electronic threshold switch has an input and has an output, and where the input of the electronic threshold switch is connected to the output of the digital to analog converter.

27. A device for digital speed control of an asynchronous motor fed via a static power converter comprising (a) a static power converter having an input and an output;

(b) a motor connected to said output (c) a rotational speed measurement device coupled with said motor and having an output delivering a first pulse sequence, which in its frequency $f_i$ is proportional to the actual speed of said motor;

(d) a digital up/down counter means (4) having a first input (5) connected to the output of the speed measuring device for receiving said first pulse sequence, said counting means further having a second input and having an output, whereat a second pulse sequence having a frequency $f_n$ corresponding to a set-point rotational speed for said motor is fed to said second input of said counter means, and where said counter means provides at its output a digital signal, which in the case of said first and second pulse sequences having identical frequence corresponds to the mean count value of the counter means, and which digital output signal in case of a frequency deviation between said first and second pulse sequences is a digital speed error signal deviating upwardly or downwardly, respectively, from said mean count value of said counter means;

(e) digital-to-analog converting means (8) having an input connected to the output of said counting means and having an output;

(f) frequency-to-voltage converting means (13) receiving at its input said second pulse sequence;

(g) time period-to-voltage converting means (17) having a first input (16), a second input (18) and an output (19), whereat its first input is connected to the output of said frequency-to-voltage converting means (13) and whereat its second input receives said first pulse sequence so that its output delivers a voltage depending on both the frequency $f_n$ of said second pulse sequence and the period duration $1/f_i$ of said first pulse sequence;

(h) summing means (12) having a first input (11), a second input (23) and an output (24), whereat said first input is placed in connection with the output of said D/A converting means (8), and said second input is placed in connection with the output of the time period-to-voltage converting means (12);

(i) multiplying means (15) having first and second inputs and an output, whereat the first input (25) is connected to the output of said means and the second input (14) is connected to the output of said frequency-to-voltage converting means;

(j) voltage-to-frequency converting (27) means having an input connected to the output of said multiplying means (15) and having an output connected to a frequency control input of said static power converter.

28. The device for digital speed control according to claim 27, wherein the time period voltage converter circuit comprises
a first monoflop having an input and an output and receiving at the input as an input signal the pulse sequence ($f_i$) of the rotation-speed measurement device corresponding to the actual rotation speed;
a second monoflop having an output and connected in series to the first monoflop;
a current generator delivering a current ($I_n$) corresponding to the set-point rotation speed;
a first switch having an input connected to the output of the first monoflop, where the first switch is controlled by an output signal of the first monoflop;
a first capacitor, where the first switch and the first capacitor are connected to each other at a connection point and where they form a series connection disposed between the output of the current generator and the reference potential;
a second switch connected in parallel to the first capacitor and connected to the output of the second monoflop and controlled by the output signal of the second monoflop;
a first amplifier having an input and an output, where the input is connected to the connection point of the first switch and of the first capacitor;

a third switch having a control input, an input and an output, where the control input of the third switch is connected to the output of the first monoflop and where the third switch is controlled by the output signal of the first monoflop, and where the input of the third switch is connected to the output of the first amplifier;
a second amplifier having an input and an output, where the input of the second amplifier is connected to the output of the third switch and where the output of the second amplifier delivers a voltage proportional to the period duration of the rotation-speed measurement-device output frequency with reference to the rotation-speed set-point value;
a second capacitor having an input and an output where the input of the second capacitor is connected to the output of the third switch and where the output of the second capacitor is connected to a reference potential.

29. The device for digital speed control according to claim 28, wherein
the first switch is provided as an electronic idle-current connection and where the second switch as well as the third switch are formed as electronic current closing connection furnishing switching control with normally-open contacts.

30. The device for digital speed control according to claim 28, wherein the multiplying means has a second input and wherein the current generator of the time period voltage converter circuit has a control input connected to the output of the frequency-to-voltage converting means and where the output of the frequency-to-voltage converting means is connected to the second input of the multiplying means.

31. The device for digital speed control according to claim 28 further comprising
a differentiator circuit having an input and having an output, where the input of the differentiator circuit is connected to the output of the time period voltage converting means for delivering of the voltage proportional to the period-duration of the rotation-speed measurement-device output pulse sequence with reference to the rotation-speed set-point value and where the output of the differentiator circuit is connected to the second input of the summating means.

32. The device for digital speed control according to claim 28 further comprising
a digital delay circuit having a first input connected to the output of the rotation speed measurement device, a second input receiving rotation speed set point signals, a first output connected to the first input of the digital up/down counter means and having a second output connected to the second input of the digital up/down counter means, such that the digital delay circuit is disposed to receive the actual rotation-speed pulse sequence ($f_i$) and the set-point rotation-speed pulse sequence ($f_n$), and to deliver delayed output to the digital up-down counter means for preventing pulse overlapping.

33. The device for digital speed control according to claim 32 wherein the delay circuit comprises
a first flipflop having a clock cycle input, having a data input and having a signal output, where an actual rotation-speed pulse sequence ($f_i$) is fed to the data input of the first flipflop;

a second flipflop having a clock cycle input, having a data input and having a signal output, where a set-point rotation-speed pulse sequence ($f_n$) is fed to the data input of the second flipflop;

a square-wave generator having an output, where the output of the square-wave generator is connected to the clock cycle input of the first flipflop, where the output of the square-wave generator provides a clock cycle frequency, which is substantially higher than the maximum rotation-speed-dependent pulse frequency and where the signal output of the first flipflop is connected to the first input of the digital up/down counter means and where the signal output of the second flipflop is connected to the second input of the digital up/down counter means and where the first and second input of the digital up/down counter means are coordinated to the two counting directions of the digital up/down counter means; and an inverter having an input connected to the output of the square-wave generator and having an output connected to the clock cycle input of the second flipflop.

34. The device for digital speed control according to claim 27, wherein the counting value of the digital up-/down counter means is limited in both directions for preventing an overflow of the digital up/down counter means.

35. The device for digital speed control according to claim 27 further comprising an electronic threshold switch having an input and having an output, where the input of the electronic threshold switch is connected to the output of the digital to analog converting means and where the output of the threshold switch delivers an alarm signal upon reaching of a preset threshold value.

36. A device for digital speed control of an asynchronous motor via a static power converter, wherein (a) a first pulse sequence corresponding in its frequency $f_n$ to the set-point rotational speed of said motor and a second pulse sequence delivered by a speed measuring device coupled with said motor and corresponding in its frequency $f_i$ to the actual speed of the motor are fed to two inputs of a digital up/down counting means (4), whereat the output of said counting means in case of the frequencies of both pulse sequences being identical provides a digital output signal corresponding to the mean count value of said counting means, and which in the case of frequency deviation between the two pulse sequences provides a digital speed error signal deviating upwardly or downwardly, respectively from said mean count value;

(b) a digital to analog converting means (8) is connected to the output of said counting means and the output signal of said converting means is compared with a voltage proportinal to a set-point speed of said motor, and a voltage-to-frequency converting means (27) supplied with a voltage resulting from said comparison delivers at its output a digital control signal for said static power converter;

(c) an output of said digital-to-analog converting means (8) is placed in connection with a first input (11) of summing means (12);

(d) first frequency-to-voltage converting means (13) is supplied with said first pulse sequence and delivers at its output a voltage corresponding to the set-point of the motor speed;

(e) second frequency-to-voltage converting means (17) having a first input (16) connected to the output of said first frequency-to-voltage converting means and having a second input (18) receiving said second pulse sequence delivers a voltage depending on both the motor speed set point $f_n$ and the period duration $1/f_i$ of the second pulse sequence $f_i$ which voltage is fed to a second input (23) of said summing means;

(f) multiplying means (15) having two inputs and an output (26) is connected with its first input (25) to the output of said summing means and is connected with its second input (14) to the output of said first frequency-to-voltage converting means (13), whereat the output of said multiplying means is connected to the input of said voltage-to-frequency converting means (27).

37. The device for digital speed control according to claim 36, wherein the second frequency-to-voltage converting means (17), delivering a voltage depending both on the rotation-speed set-point value ($f_n$) as well as on the period duration ($1/f_i$) of the rotation-speed measurement-device output signal ($f_i$), is connected with a first reference signal control input (16) to the output (54) of the first frequency-to-voltage converting means (13) and with a second control input (18) to the rotation-speed measurement device (50), while the output (19) of this second frequency-to-voltage converting means (17) is connected to the second input (23) of a summating means (12).

38. The device for digital speed control according to claim 37, wherein the period duration measurement converter circuit (17) comprises (i) two monoflops (32, 33) connected in series, of which the first monoflop (32) receives as an input signal the pulse sequence ($f_i$) of the rotation-speed measurement device corresponding to the actual rotation speed;

(j) a current generator (31), which delivers a current ($I_n$) corresponding to the set-point rotation speed;

(k) a series connection disposed between the output of the current generator and the reference potential, comprising a first electronic switch (35) controlled by the output signal of the first monoflop (32) and a first capacitor (C1);

(l) a second electronic switch (36) connected in parallel to the first capacitor (C1) and controlled by the output signal of the second monoflop (33);

(m) a first amplifier (39) connected on the input side at the connection point (38) of the first electronic switch (35) and of the first capacitor (C1), where a third electronic switch (40) is connected in between the output of the first amplifier (39) and the input (42) of the following second amplifier (41), where the third electronic switch (40) is controlled by the output signal of the first monoflop (32);

(n) a second capacitor (C2) connected between the input (42) of the second amplifier (41) and the reference potential, (o) an output (19) of the second amplifier for delivering a voltage proportional to the period duration of the rotation-speed measurement-device output frequency with reference to the rotation-speed set-point value.

39. The device for digital speed control according to claim 38, wherein the first electronic switch (35) is provided as an electronic idle-current connection and the second electronic switch (36) as well as the third electronic switch (40) are formed as electronic current closing connection furnishing switching control with normally-open contacts.

40. The device for digital speed control according to claim 38, wherein the current generator (31) having a reference signal control input (16) is connected to the output (54) of the first frequency to voltage converting means (13), where the output (54) is connected with the other input (14) of the multiplying means (15).

41. The device for digital speed control according to claim 38, wherein a differentiator circuit (20) is connected between the second frequency-to-voltage converting means (17) for delivering of the voltage proportional to the period-duration of the rotation-speed measurement-device output pulse sequence with reference to the rotation-speed set-point value and the second input (23) of the summating means (12).

42. The device for digital speed control according to claim 36, wherein between the inputs (1, 2), delivering the actual rotation-speed pulse sequence ($f_i$) and the set-point rotation-speed pulse sequence ($f_n$), and the up-down counter (4), there is connected a digital delay and overlap-blocking circuit (3) preventing pulse overlapping.

43. The device for digital speed control according to claim 42, wherein (p) the actual rotation-speed pulse sequence ($f_i$) is fed to the data input (D1) of the first flipflop (43), and the set-point rotation-speed pulse sequence ($f_n$) is fed to the data input (D2) of a second flipflop (44);

(q) the output of a square-wave generator (46), which provides a cycle frequency, which is substantially higher than the maximum rotation-speed-dependent pulse frequency, is connected to the cycle pulse input (C11) of the first flipflop (43) and is connected via an inverter (45) to the cycle pulse input (C12) of the second flipflop (44); and (r) the signal output (Q1, Q2) of the two flipflops (43, 44) are connected to the counter inputs (5, 6) coordinated to the two counting directions of the digital up/down counting means (4).

44. The device for digital speed control according to claim 36, wherein the counting value of the digital up/down counting means (4) is limited in both directions and where an overflow of the digital up/down counting means is prevented.

45. The device for digital speed control according to claim 36 further comprising
an electronic threshold switching element (29) connected to the output (9) of the digital to analog converting means (8), which threshold switching element (29) delivers an alarm signal upon reaching of a preset threshold value.

* * * * *